US011979295B2

(12) United States Patent
Shen et al.

(10) Patent No.: US 11,979,295 B2
(45) Date of Patent: May 7, 2024

(54) REINFORCEMENT LEARNING AGENT TRAINING METHOD, MODAL BANDWIDTH RESOURCE SCHEDULING METHOD AND APPARATUS

(71) Applicant: ZHEJIANG LAB, Zhejiang (CN)

(72) Inventors: Congqi Shen, Hangzhou (CN); Huifeng Zhang, Hangzhou (CN); Shaofeng Yao, Hangzhou (CN); Qi Xu, Hangzhou (CN); Ruyun Zhang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 18/359,862

(22) Filed: Jul. 26, 2023

(65) Prior Publication Data

US 2024/0015079 A1    Jan. 11, 2024

Related U.S. Application Data

(63) Continuation of application No. PCT/CN2022/130998, filed on Nov. 10, 2022.

(30) Foreign Application Priority Data

Jul. 5, 2022 (CN) .......................... 202210782477.4

(51) Int. Cl.
*H04L 41/16* (2022.01)
*G06N 20/00* (2019.01)
*H04L 41/40* (2022.01)

(52) U.S. Cl.
CPC ............. *H04L 41/16* (2013.01); *G06N 20/00* (2019.01); *H04L 41/40* (2022.05)

(58) Field of Classification Search
CPC .......... H04L 41/16; H04L 41/40; G06N 20/00
See application file for complete search history.

(56) References Cited

U.S. PATENT DOCUMENTS

| 2020/0162535 A1 | 5/2020 | Ma et al. |
| 2021/0241090 A1* | 8/2021 | Chen ..................... H04W 24/02 |

(Continued)

FOREIGN PATENT DOCUMENTS

| CN | 108683614 A | 10/2018 |
| CN | 111988225 A | 11/2020 |

(Continued)

OTHER PUBLICATIONS

International Search Report (PCT/CN2022/130998); dated Mar. 16, 2023.

(Continued)

*Primary Examiner* — Adnan M Mirza
(74) *Attorney, Agent, or Firm* — W&G Law Group (57) ABSTRACT

The present disclosure discloses a reinforcement learning agent training method, modal bandwidth resource scheduling method and apparatus. The reinforcement learning agent training method utilizes a reinforcement learning agent to continuously interact with a network environment in a polymorphic smart network to obtain the latest global network characteristics and output updated actions. By adjusting the bandwidth occupied by modals, a reward value is set to determine an optimization target for the agent, the scheduling of modals is realized, and the rational use of polymorphic smart network resources is guaranteed. The trained reinforcement learning agent is applied to the modal bandwidth resource scheduling method, and can adapt to networks with different characteristics, and thus can be used for intelligent management and control of polymorphic smart networks and has good adaptability and scheduling performance.

9 Claims, 5 Drawing Sheets

(56) References Cited

U.S. PATENT DOCUMENTS

| | | | |
|---|---|---|---|
| 2022/0124543 A1* | 4/2022 | Orhan | G06N 3/006 |
| 2022/0166683 A1* | 5/2022 | Shiner | H04J 14/0284 |
| 2022/0210200 A1 | 6/2022 | Crabtree et al. | |

FOREIGN PATENT DOCUMENTS

| | | | |
|---|---|---|---|
| CN | 112465151 A | 3/2021 | |
| CN | 113254197 A | 8/2021 | |
| CN | 113328938 A | 8/2021 | |
| CN | 113595923 A | 11/2021 | |
| CN | 113963200 A | 1/2022 | |
| CN | 114626499 A | 6/2022 | |
| CN | 114866494 A | 8/2022 | |
| WO | 2022083029 A1 | 4/2022 | |

OTHER PUBLICATIONS

Notice of Allowance(CN202210782477.4); dated Aug. 16, 2022.
Survey-of-deep-reinforcement-learning-based-on-walue-function-and-policy-gradient.

* cited by examiner

REINFORCEMENT LEARNING AGENT TRAINING METHOD, MODAL BANDWIDTH RESOURCE SCHEDULING METHOD AND APPARATUS

CROSS-REFERENCE TO RELATED APPLICATIONS

The present disclosure is a continuation of International Application No. PCT/CN2022/130998, filed on Nov. 10, 2022, which claims priority to Chinese Application No. 202210782477.4, filed on Jul. 5, 2022, the contents of both of which are incorporated herein by reference in their entireties.

TECHNICAL FIELD

The present disclosure belongs to that technical field of network management and control, and particularly relates to a reinforcement learning agent training method, a modal bandwidth resource scheduling method and an apparatus.

BACKGROUND

In a polymorphic smart network, a variety of network protocols are running at the same time, and each technology system is a network modal. Various network modals share network resources. If they are not well managed or controlled, they will directly compete for network resources, such as bandwidth, which will directly affect the communication transmission quality of some key modals. Therefore, reasonable control of each modal in the network is one of the necessary prerequisites to ensure the stable operation of a polymorphic smart networks.

At present, the prevailing technology for the above requirements is to control the proportion of bandwidth used in switch ports and limit the size of traffic at the export to avoid network overload.

In that process of implementing the present disclosure, the inventor found that the prior art has at least the follow problem:

Static strategies (such as limiting the bandwidth usage ratio to a certain maximum) will not be able to adapt to the dynamic changes of network modals. However, in the actual network, it is very likely that the traffic of individual modals will increase due to business changes, and the original static strategy is no longer applicable.

SUMMARY

It is an object of the embodiment of the application to provide a reinforcement learning agent training method, a modal bandwidth resource scheduling method and an apparatus, so as to solve the technical problem that modal resources in a polymorphic smart network cannot be intelligently controlled in the related art.

A first aspect of an embodiment of the present disclosure provides a modal bandwidth resource scheduling method in a polymorphic smart network, including:

S11, constructing a state of a global network characteristic, an action and a deep neural network model required for training the reinforcement learning agent, the deep neural network model including a new execution network, an old execution network and an action evaluation network;

S12, setting a maximum number of steps in a round of training;

S13, acquiring the state of the global network characteristic in each step, inputting the state of the global network characteristic into the new execution network, controlling Software Defined Network (SDN) switches to execute actions output by the new execution network, acquiring the state of the global network characteristic and reward values after the SDN switches execute the actions, and storing the actions, the reward values and the states in two periods before and after the actions are executed in an experience pool;

S14, updating network parameters of the action evaluation network according to all the reward values and the states before the actions are executed in the experience pool;

S15, assigning network parameters of the new execution network to the old execution network, and updating the network parameters of the new execution network according to all actions and the states before the actions are executed in the experience pool;

S16, repeating steps S13-S15 until the bandwidth occupied by each modal in the polymorphic smart network ensures the communication transmission quality without overloading a network export.

Further, the global network characteristic state includes a number of packets in each modal, an average packet size of each modal, an average delay of each flow, a number of packets in each flow, a size of each flow and an average packet size in each flow.

Further, the action is a sum of an average value and noises of action vectors selected under the state of the corresponding global network characteristics.

Further, the step of updating network parameters of the action evaluation network according to all the reward values and the states before the actions are executed in the experience pool includes:
  inputting all states before the actions are executed in the experience pool into the action evaluation network to obtain corresponding expected values;
  calculating a discount reward in the state before each action according to the expected values, the corresponding reward values and a preset decay rate;
  calculating a difference between the discount reward and the expected value, calculating a mean square deviation according to all differences, and taking the obtained mean square deviation as a first loss value to update the network parameters of the action evaluation network.

Further, the step of updating the network parameters of the new execution network according to all actions and the states before the actions are executed in the experience pool includes:
  inputting all states before the actions are executed in the experience pool into the old execution network and the new execution network respectively to obtain old execution action distribution and new execution action distribution;
  calculating a first probability and a second probability that each action in the experience pool appears in the corresponding old execution action distribution and new execution action distribution;
  calculating a ratio of the second probability to the first probability;
  multiplying all the ratios by the corresponding differences and averaging to obtain a second loss value to update the network parameters of the new execution network.

A second aspect of an embodiment of the present disclosure provides a reinforcement learning agent training apparatus in a polymorphic smart network. The apparatus is applied to a reinforcement learning agent, the apparatus including:
  a construction module configured to construct a deep neural network model required for a state and an action of a global network characteristic and training of the reinforcement learning agent, the deep neural network model including a new execution network, an old execution network and an action evaluation network;
  a setting module configured to set a maximum number of steps in a round of training;
  an execution module configured to acquire the global network characteristic state in each step, input the global network characteristic state into the new execution network, control SDN switches to execute actions output by the new execution network, acquiring the network state of the global network characteristic and reward values after the SDN switches execute the actions, and store the actions, the reward values and the states in two periods before and after the actions are executed in an experience pool;
  a first updating module configured to update network parameters of the action evaluation network according to all the reward values and the states before the actions are executed in the experience pool;
  a second updating module configured to assign network parameters of the new execution network to the old execution network, and update the network parameters of the new execution network according to all actions and the states before the actions are executed in the experience pool; and
  a repeating module configured to repeat steps S13-S15 until the bandwidth occupied by each modal in the polymorphic smart network ensures the communication transmission quality without overloading a network export.

A third aspect of an embodiment of the present disclosure provides a modal bandwidth resource scheduling method in a polymorphic smart network, including:
  applying a reinforcement learning agent trained by the reinforcement learning agent training method in a polymorphic smart network according to any one of claims 1 to 5 to the polymorphic smart network;
  scheduling resources occupied by each modal according to a scheduling strategy output by the reinforcement learning agent.

A fourth aspect of an embodiment of the present disclosure provides an apparatus for scheduling modal bandwidth resources in a polymorphic smart network, including:
  an application module configured to apply a reinforcement learning agent trained by the reinforcement learning agent training method in a polymorphic smart network according to any one of claims 1 to 5 to the polymorphic smart network; and
  a scheduling module configured to schedule resources occupied by each modal according to a scheduling strategy output by the reinforcement learning agent.

A fifth aspect of an embodiment of the present disclosure provides an electronic device, including:
  one or more processors;
  a memory for storing one or more programs;
  when the one or more programs are executed by the one or more processors, the one or more processors implement the reinforcement learning agent training method in a polymorphic smart network or the modal bandwidth resource scheduling method in the polymorphic smart network.

A sixth aspect of an embodiment of the present disclosure provides a computer-readable storage medium on which computer instructions are stored, when executed by a processor, the instructions implement the steps of the reinforcement learning agent training method in a polymorphic smart network or the modal bandwidth resource scheduling method in a polymorphic smart network.

The technical solution provided by the embodiment of the application may have the following beneficial effects.

As can be seen from the above embodiments, the application uses the idea of reinforcement learning algorithms to construct the global network characteristic states, execution actions and reward functions suitable for the polymorphic smart network, so that reinforcement learning agent can continuously interact with the network and output the optimal execution actions according to the changes of the network states and reward values, so that the allocation of polymorphic smart network resources meets expectations, and the network operation performance is guaranteed, which has strong practical significance for promoting the intelligent management and control of the polymorphic smart network.

It is to be understood that both the foregoing general description and the following detailed description are exemplary and explanatory only and are not intended to limit the present disclosure.

BRIEF DESCRIPTION OF DRAWINGS

The attached drawings, which are incorporated in and constitute a part of this specification, illustrate embodiments consistent with this application and serve to explain the principles of this application together with the description.

DESCRIPTION OF EMBODIMENTS

Reference will now be made in detail to exemplary embodiments, examples of which are illustrated in the attached drawings. When the following description refers to the drawings, unless otherwise indicated, the same numbers in different drawings indicate the same or similar elements. The embodiments described in the following exemplary embodiments do not represent all embodiments consistent with this application.

The terminology used in this application is for the purpose of describing specific embodiments only and is not intended to limit this application. The singular forms "a", "said" and "the" used in this application and the appended claims are also intended to include the plural forms, unless the context clearly indicates other meaning. It should also be understood that the term "and/or" as used herein refers to and includes any or all possible combinations of one or more associated listed items.

It should be understood that although the terms "first", "second", "third", etc. may be used in this application to describe various information, this information should not be limited to these terms. These terms are only used to distinguish the same type of information from each other. For example, without departing from the scope of this application, the first information can also be called the second information, and similarly, the second information can also be called the first information. Depending on the context, the word "if" as used herein can be interpreted as "when" or "in case of" or "in response to a determination".

Embodiment 1

Figure 1:
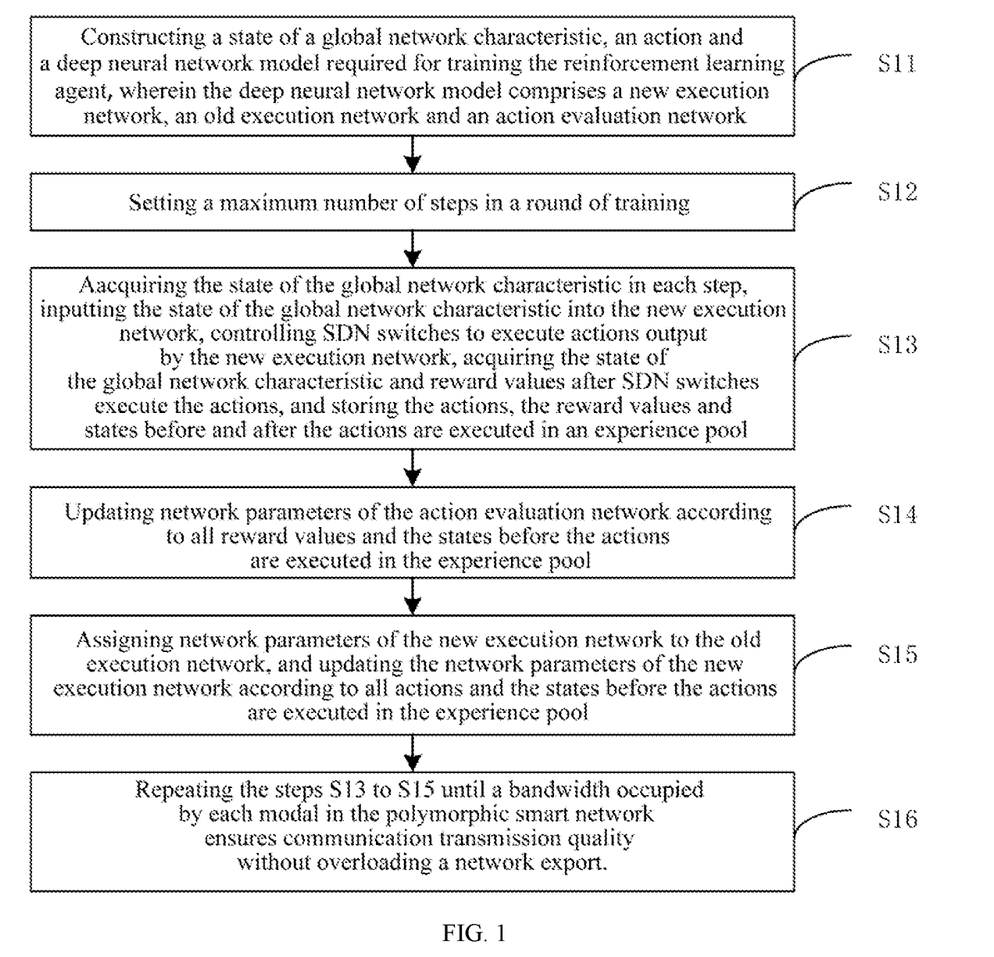
FIG. 1 is a flowchart of a reinforcement learning agent training method in a polymorphic smart network according to an exemplary embodiment.

FIG. 1 is a flowchart of a reinforcement learning agent training method in a polymorphic smart network according to an exemplary embodiment. As shown in FIG. 1, the method is applied to a reinforcement learning agent and may include the following steps:

S11, a state of a global network characteristic, an action and a deep neural network model required for training the reinforcement learning agent are constructed; the deep neural network model comprises a new execution network, an old execution network and an action evaluation network;

S12, a maximum number of steps is set in a round of training;

S13, the global network characteristic state is acquired in each step, the global network characteristic state is input into the new execution network, SDN switches are controlled to execute actions output by the new execution network, network states and reward values after the SDN switches execute the actions are acquired, and the actions, the reward values and the states in two periods before and after the actions are executed are stored in an experience pool;

S14, network parameters of the action evaluation network are updated according to all the reward values and the states before the actions are executed in the experience pool;

S15, network parameters of the new execution network are assigned to the old execution network, and the network parameters of the new execution network are updated according to all actions and the states before the actions are executed in the experience pool;

S16, steps S13-S15 are repeated until the bandwidth occupied by each modal in the polymorphic smart network ensures the communication transmission quality without overloading a network export.

As can be seen from the above embodiments, the application uses the idea of reinforcement learning algorithms to construct the global network characteristic states, execution actions and reward functions suitable for the polymorphic smart network, so that reinforcement learning agent can continuously interact with the network and output the optimal execution action according to the changes of the network state and reward value, so that the allocation of polymorphic smart network resources meets expectations, and the network operation performance is guaranteed, which has strong practical significance for promoting the intelligent management and control of the polymorphic smart network.

In the concrete implementation of step S11, a state of a global network characteristic, an action and a deep neural network model required for training the reinforcement learning agent are constructed, and the deep neural network model includes a new execution network, an old execution network and an action evaluation network:

In an embodiment, the global network characteristic state includes the number of packets in each modal, the average packet size in each modal, the average delay in each flow, the number of packets in each flow, the size of each flow, and the average packet size in each flow. These characteristics constitute the global network state of the current time interval of $\Delta t$ seconds. $s_t$ is used to represent the global network characteristics in the $t^{th}$ $\Delta t$ seconds.

In an embodiment, the action is the sum of the average value and the noises of the action vectors selected under the state of the corresponding global network characteristic. $a_t$ is used to represent the action of the $t^{th}$ $\Delta t$ seconds. The action is used to adjust the bandwidth of the flow, and then schedule the resources occupied by each modal to ensure that the network communication quality meets the expected goal. The physical meaning of the action is the ratio of each flow to the export area in each modal. P is used to represent the number of modals running in the network. Since a modal corresponds to a network protocol, it is assumed that the number of modals running in the network is fixed. $F^m$ is used to represent the maximum number of flows in each modal, and the output action space dimension is $P \times F^m$. $F(p,t)$ is used to represent the number of flows based on the $p^{th}$ modal in the $t^{th}$ $\Delta t$ seconds, which satisfies $F(p,t) < F^m$. Therefore, in the $t^{th}$ $\Delta t$ seconds, only $P \times F(p,t)$ elements have corresponding flows, with a value of 0.1-1, while other elements have no actual flows, with a value of 0.

In the concrete implementation, for the convenience of implementation, the same architecture can be adopted for the new execution network, the old execution network and the action evaluation network, for example, a deep neural network, a convolutional neural network, a cyclic neural network and other architectures can be adopted. Initialize parameters randomly after network construction is completed.

In the concrete implementation of step S12, the maximum number of steps in one round of training is set;

In an embodiment, the maximum number of steps T is set for each round of training. In practice, the value of T is related to the number of modals in the network and other factors, therefore it is necessary to try to choose a more optimal value many times during the training process. For example, if the number of modals in the network is 8, it is optimal that T is 120 after many attempts.

In the concrete implementation of step S13, in each step, the global network characteristic state is obtained, the global network characteristic state is input into the new execution network, the SDN switches are controlled to execute the action output by the new execution network and the network states of the global network characteristic and reward values after the action are acquired, and the actions, reward values and the states before and after the action are stored in the experience pool;

In an embodiment, in each step, the reinforcement learning agent acquires the global network characteristics in a period of $\Delta t$ seconds by a controller at the sampling interval of $\Delta t$ seconds. The current network state $s_t$ is into the new execution network, and the mean value $\mu(s_t|\theta^\mu)$ and variance N of the execution action based on the current parameter $\theta^\mu$, and the output execution action is expressed as $$a_t = \mu(s_t|\theta^\mu) + N$$

where $\mu(s_t|\theta^\mu)$ represents the average value of the action vectors selected by the reinforcement learning agent in a certain state of $s_t$, $\theta^\mu$ represents the parameter of the new execution network, and N represents the noise, which is a normal function that decays with time.

The SDN controller sets the bandwidth for each flow according to the proportion set in the execution action, converts it into an instruction recognizable by the SDN switches, and issues the configuration. The SDN switches receive the configuration and forwards the flows of various modals according to the configured bandwidth. If a flow needs to occupy more bandwidth than the configured bandwidth, part of the flow will be randomly discarded to meet the allocated bandwidth.

The reinforcement learning agent obtains the new state $s_{t+1}$ and the reward value $r_t$ of the network after executing the action, and stores $(s_t, a_t, r_t, s_{t-1})$ in the experience pool. For a round of training, the reinforcement learning agent will go through the process of step S13 for T times, during which the network parameters are not updated, where the reward value $r_t$ is the value of the reward function calculated by the reinforcement learning agent. The reward function is defined as follows $$r_t = \begin{cases} \sum_{p=1}^{P} \eta_p \dfrac{\sum_{i=1}^{F(p,t)} v_p(i,t)\beta_p(i,t)}{\sum_{i=1}^{F(p,t)} v_p(i,t)} & \sum_{p=1}^{P}\sum_{i=1}^{F(p,t)} v_p(i,t)\beta_p(i,t) < \xi \\ -1 & \sum_{p=1}^{P}\sum_{i=1}^{F(p,t)} v_p(i,t)\beta_p(i,t) \geq \xi \end{cases}$$

where $\eta_p$ is the weight coefficient of the $p^{th}$ modal, the value of which is determined artificially according to the network operation quality target, $$0 < \eta_p < 1, \sum_{p=1}^{P} \eta_p = 1 \cdot v_p(i,t)$$

is the velocity of the $i^{th}$ flow in the $p^{th}$ modal in the $t^{th}$ $\Delta t$ seconds, which can be obtained from the global network characteristic state. $\beta_p(i,t)$ is the proportion of the $i^{th}$ flow in the $p^{th}$ modal reaching the server in the $t^{th}$ $\Delta t$ seconds, which can be obtained from the execution action. $\xi$ is the upper limit of the flows that can be carried by the export area during normal operation.

The setting of the above reward function can allocate appropriate bandwidth according to the communication transmission situation of different modals in the network, and at the same time avoid the network overload caused by the preemption of network resources by each modal. In the aspect of bandwidth resource allocation, the proportion of the number of flows arriving at the server in each modal is used to characterize the transmission of this modal. If the transmission of this modal is congested, even if its weight coefficient is not high or the whole network is not congested temporarily, the reward function will push the subsequent actions to allocate more bandwidth to this modal. If multiple modals in the network are congested, the modal with a higher weight coefficient will get more bandwidth, which is also in line with the actual needs, that is, giving priority to more important communication services. In order to avoid network overload, a penalty value of −1 is used to make negative feedback to the previous action and reduce the allocated bandwidth to avoid network overload. Therefore, the setting of the above reward function can ensure the normal operation of the network, and at the same time dynamically adjust the bandwidth resource allocation according to the transmission situation of each modal in the network.

Figure 2:
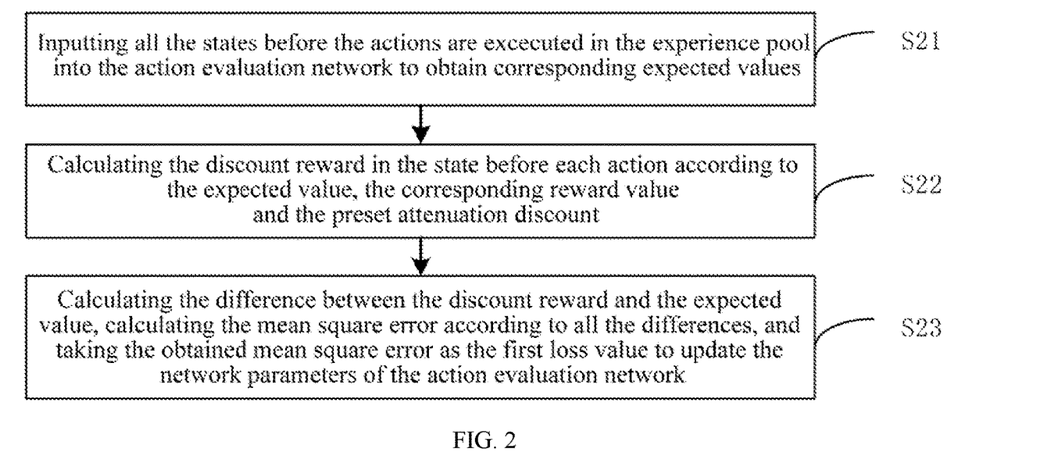
FIG. 2 is a flowchart of step S14 according to an exemplary embodiment.

In the concrete implementation of step S14, the network parameters of the action evaluation network are updated according to all the reward values and the state before the action is executed in the experience pool;

In an embodiment, as shown in FIG. 2, this step may include the following sub-steps.

Step S21, all the states in the experience pool before executing actions are input into the action evaluation network to obtain corresponding expected values;

In an embodiment, in the sample in the experience pool, $s_t$ in the sample is input into the action evaluation network to get the corresponding expected value $V(s_t)$ t=1, 2, . . . , T. The expected value represents the evaluation of the network state at time t, that is, the instantaneous value of the current state to achieve the goal set by the reward function.

Step S22, the discount reward in the state before each action is calculated according to the expected value, the corresponding reward value and the preset decay rate;

In an embodiment, the discount reward for each $s_t$ is calculated.

$R(t)=-V(s_t)+r_t+\gamma r_{t-1}+\gamma^2 r_{t+2}+ \ldots +\gamma^{T-1-t}r_{T-1}+\gamma^{T-t}V(s_T)$, t=1, 2, . . . , T, where $\gamma$ is the decay rate, which is artificially taken. Since each round of training needs to go through T steps, it needs to know the long-term value of the current network state for the subsequent network state changes to achieve the goal set by the reward function.

S23, the difference between the discount reward and the expected value is calculated, the mean square error is calculated according to all the differences, and the obtained mean square error is taken as the first loss value to update the network parameters of the action evaluation network;

In an embodiment, $R(t)-V(s_t)$, t=1, 2, . . . , T is calculated according to the sample distribution, and the standard deviation is calculated as the first loss value for updating the action evaluation network parameters; this difference represents the gap between instantaneous value and long-term value; this gap is used to adjust the subsequent parameters of the action evaluation network and optimize the output execution action; the smaller the gap is, the closer the action network is to the optimum.

In the concrete implementation of step S15, the network parameters of the new execution network are assigned to the old execution network, and the network parameters of the new execution network are updated according to all actions and the states before the actions are executed in the experience pool;

In an embodiment, it needs to constantly compare the parameters of the old and new execution networks, and update the parameters of the execution networks to continuously optimize the output actions, so as to finally make the parameters of the new execution network optimal and output the optimal actions.

Figure 3:
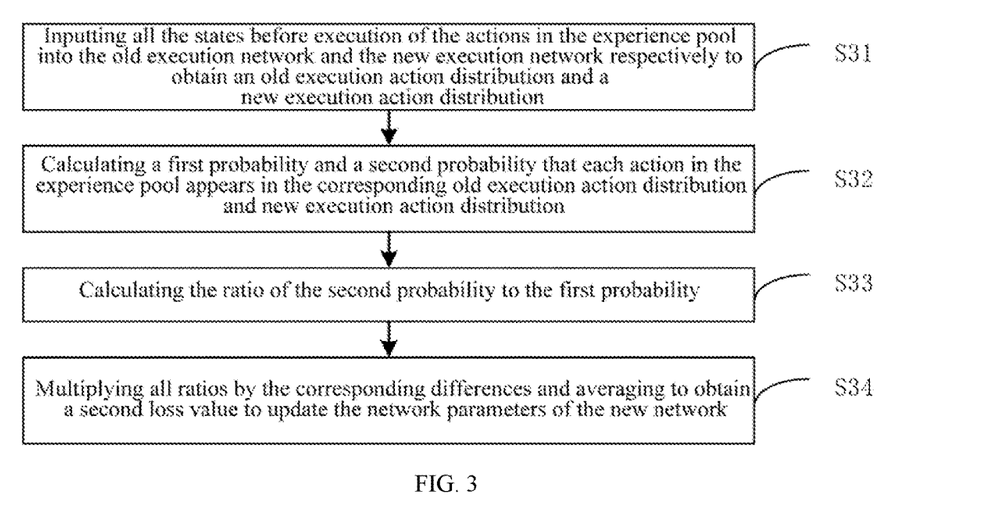
FIG. 3 is a flowchart of "updating the network parameters of the new network according to all actions and the state before the actions are executed in the experience pool" according to an exemplary embodiment.

In an embodiment, as shown in FIG. 3, "updating the network parameters of the new network according to all actions in the experience pool and the state before executing the actions" may include the following sub-steps.

Step S31, all the states before execution of the actions in the experience pool are input into the old execution network and the new execution network respectively to obtain an old execution action distribution and a new execution action distribution;

In an embodiment, $s_t$ in the samples stored in the experience pool is input into the old execution network and the new execution network obtain old execution action distribution and new execution action distribution with action normal distribution; the implementation of the old and new execution networks is also based on the same neural network architecture, and the two architectures are the same, only the parameters being different; since the input of these two neural networks is set as the network state sample $s_t$, and the output as the mean value $\mu(s_t|\theta^\mu)$ and variance N of the current optimal execution action. At the same time, it is generally assumed that the probability distribution of actions is a normal distribution, therefore it can be determined that the old probability distribution and the new probability distribution of actions based on the outputs of two execution networks.

S32, a first probability and a second probability that each action in the experience pool appears in the corresponding old execution action distribution and new execution action distribution are calculated;

In an embodiment, a first probability $p_{old}(a_t)$ and a second probability $p_{new}(a_t)$ of each stored action $a_t$, t=1, 2, . . . , T in the corresponding distribution are calculated; these two probabilities respectively represent the probability that the action stored in the sample pool is selected for execution in the old and new execution networks.

Step S33, the ratio of the second probability to the first probability is calculated;

In an embodiment, $$\text{ratio}_t = \frac{p_{new}(a_t)}{p_{old}(a_t)},$$

t=1, 2, . . . , T is calculated; and the ratio represents the parameter difference between the old and new execution networks. If the parameters between the old and new execution networks are consistent, it means that the execution networks have been updated to the best. Since it is desirable that the parameters of the networks be continuously updated and optimized, the ratio will be calculated to update the network parameters.

Step S34, all the ratios are multiplied by the corresponding differences and averaged to obtain a second loss value to update the network parameters of the new network;

In an embodiment, for t=1, 2, . . . , T, $\text{ratio}_t$ is multiplied by $R(t)-V(s_t)$ and averaged as the second loss value to update parameters of the new execution network. $\text{ratio}_t$ represents the updating direction of the action network, and $R(t)-V(s_t)$ represents the updating direction of the parameters of the evaluation network; since the optimization of the output execution action needs to be combined with the change of network state, the product of the two is selected to update the parameters of the new execution network, so that the latest network state can be learned and the action suitable for the network state is output in the next step.

In the concrete implementation of step S16, steps S13-S15 are repeated until the bandwidth occupied by each modal in the polymorphic smart network ensures the communication transmission quality and does not overload the network export;

In an embodiment, the process of S13-S15 is a round of training, and the next round of training is continued until each modal reasonably occupies the bandwidth, so as to ensure the communication transmission quality without overloading the network outlet. After sufficient training, the reinforcement learning agent has completely learned the optimal strategy in different network environments, that is, the execution action that can achieve the set expected goal.

Corresponding to the aforementioned embodiment of the reinforcement learning agent training method in a polymorphic smart network, the application also provides an embodiment of the reinforcement learning agent training apparatus in a polymorphic smart network.

Figure 4:
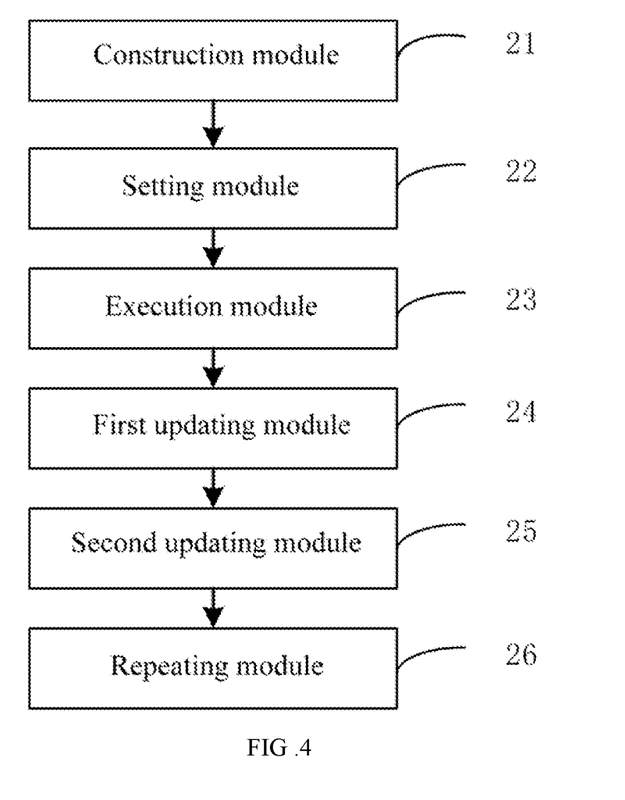
FIG. 4 is a block diagram of a reinforcement learning agent training apparatus in a polymorphic smart network according to an exemplary embodiment.

FIG. 4 is a block diagram of a reinforcement learning agent training apparatus in a polymorphic smart network according to an exemplary embodiment. Referring to FIG. 4, the apparatus is applied to a reinforcement learning agent, and may include:

a construction module 21 configured to construct a deep neural network model needed for a state and an action of a global network characteristic and training of the reinforcement learning agent, the deep neural network model including a new execution network, an old execution network and an action evaluation network;

a setting module 22 used to set a maximum number of steps in a round of training;

an execution module 23 used to acquire the global network characteristic state in each step, input the global network characteristic state into the new execution network, control SDN switches to execute actions output by the new execution network, acquiring network states of the global network characteristic and reward values after the SDN switches execute the actions, and store the actions, the reward values and the states in two periods before and after the actions are executed in an experience pool;

a first updating module 24 used to update network parameters of the action evaluation network according to all the reward values and the states before the actions are executed in the experience pool;

a second updating module 25 used to assign network parameters of the new execution network to the old execution network, and update the network parameters of the new execution network according to all actions and the states before the actions are executed in the experience pool; and a repeating module 26 used to repeat steps S13-S15 until the bandwidth occupied by each modal in the polymorphic smart network ensures the communication transmission quality without overloading a network export.

Embodiment 2

Figure 5:
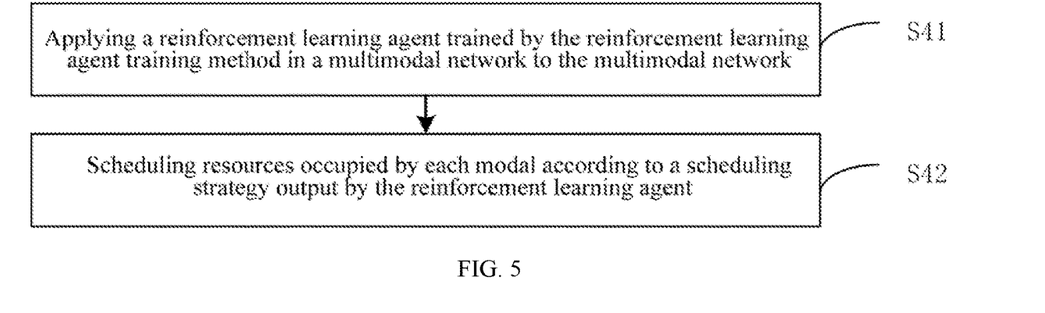
FIG. 5 is a flowchart of a modal bandwidth resource scheduling method in a polymorphic smart network according to an exemplary embodiment.

FIG. 5 is a flowchart of a modal bandwidth resource scheduling method in a polymorphic smart network according to an exemplary embodiment. As shown in FIG. 5, the method may include the following steps:

Step S41, applying a reinforcement learning agent trained by the reinforcement learning agent training method in a polymorphic smart network according to Embodiment 1 to the polymorphic smart network;

Step S42, scheduling resources occupied by each modal according to a scheduling strategy output by the reinforcement learning agent.

According to the above embodiment, the application applies the trained reinforcement learning agent to the modal bandwidth resource scheduling method, which can be adaptive to networks with different characteristics, can be used for intelligent management and control of polymorphic smart networks, and has good adaptability and scheduling performance.

In an embodiment, the reinforcement learning agent training method in the above-mentioned polymorphic smart network has been described in detail in Embodiment 1, and the application of the reinforcement learning agent to a polymorphic smart network and scheduling according to the scheduling strategy output by reinforcement learning agent are both conventional technical means in this field, and will not be repeated here.

Corresponding to the aforementioned embodiment of the modal bandwidth resource scheduling method in the polymorphic smart network, the application also provides an embodiment of the modal bandwidth resource scheduling apparatus in a polymorphic smart network.

Figure 6:
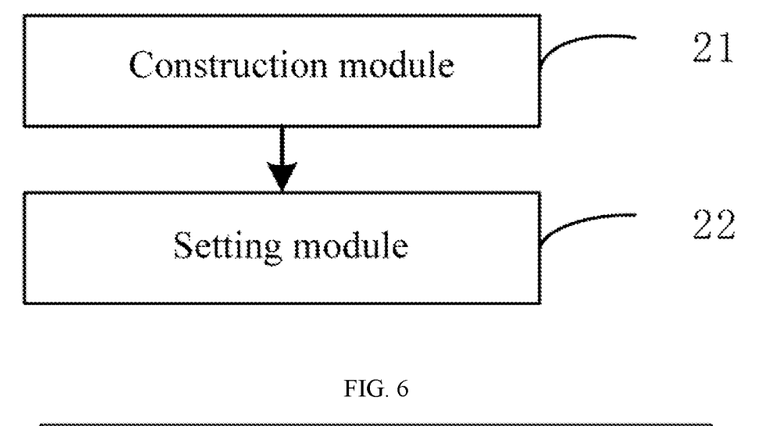
FIG. 6 is a block diagram of a modal bandwidth resource scheduling apparatus in a polymorphic smart network according to an exemplary embodiment.

FIG. 6 is a block diagram of a modal bandwidth resource scheduling apparatus in a polymorphic smart network according to an exemplary embodiment. Referring to FIG. 6, the apparatus may include:

an application module 31 used to apply a reinforcement learning agent trained by the reinforcement learning agent training method in a polymorphic smart network according to Embodiment 1 to the polymorphic smart network; and a scheduling module 32 used to schedule resources occupied by each modal according to a scheduling strategy output by the reinforcement learning agent.

With regard to the apparatus in the above embodiment, the specific way in which each module performs operations has been described in detail in the embodiment of the method, and will not be described in detail here.

For the apparatus embodiment, because it basically corresponds to the method embodiment, it is only necessary to refer to part of the description of the method embodiment for the relevant points. The apparatus embodiments described above are only schematic, in which the units described as separate components may or may not be physically separated, and the components displayed as units may or may not be physical units, that is, they may be located in one place or distributed to multiple network units. Some or all of the modules can be selected according to the actual needs to achieve the purpose of the application solution. Those skilled in the art can understand and implement it without creative labor.

Embodiment 3

Figure 7:
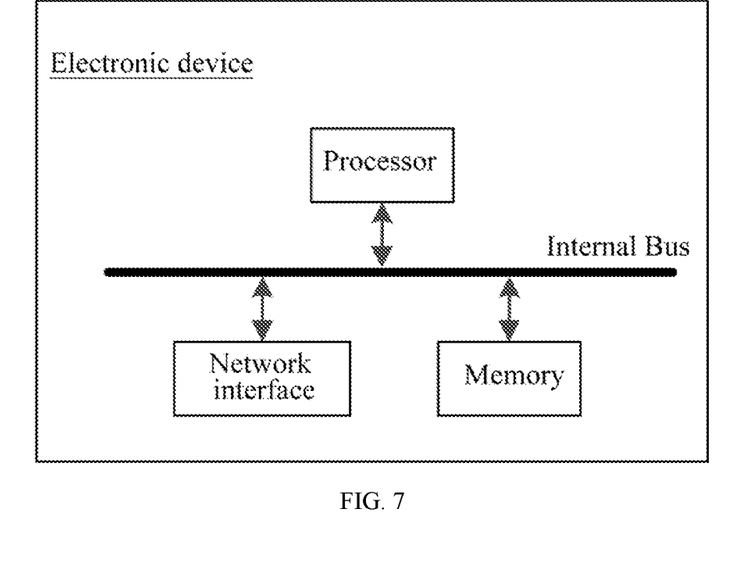
FIG. 7 is a schematic diagram of an electronic device according to an exemplary embodiment.

Correspondingly, the application also provides an electronic device, which includes one or more processors; a memory for storing one or more programs; when the one or more programs are executed by the one or more processors, the one or more processors implement the reinforcement learning agent training method in the polymorphic smart network or the modal bandwidth resource scheduling method in the polymorphic smart network as described above. As shown in FIG. 7, it is a hardware structure diagram of any apparatus with data processing capability where the reinforcement learning agent training method in a polymorphic smart network or the modal bandwidth resource scheduling method in a polymorphic smart network provided by the embodiment of the present disclosure is located. In addition to the processor, memory and network interface shown in FIG. 7, any device with data processing capability in the embodiment usually includes other hardware according to the actual function of the apparatus with data processing capability, which will not be described here again.

Embodiment 4

Correspondingly, the application also provides a computer-readable storage medium, on which computer instructions are stored, which, when executed by the processor, impellent the reinforcement learning agent training method in the polymorphic smart network or the modal bandwidth resource scheduling method in a polymorphic smart network. The computer-readable storage medium can be an internal storage unit of any apparatus with data processing capability as described in any of the previous embodiments, such as a hard disk or a memory. The computer-readable storage medium can also be an external storage apparatus of the wind turbine, such as a plug-in hard disk, Smart Media Card (SMC), a SD card, a Flash Card and the like provided on the device. Further, the computer-readable storage medium can also include both internal storage units and external storage devices of any device with data processing capability. The computer-readable storage medium is used for storing the computer program and other programs and data required by any equipment with data processing capability, and can also be used for temporarily storing data that has been output or will be output.

Other embodiments of the present disclosure will easily be conceived by those skilled in the art after considering the specification and practicing the disclosure herein. This application is intended to cover any variations, uses or adaptations of this application, which follow the general principles of this application and include common sense or common technical means in this technical field that are not disclosed in this application.

It shall be construed that this application is not limited to the precise structure described above and shown in the drawings, and various modifications and changes can be made without departing from its scope.

What is claimed is:

1. A reinforcement learning agent training method in a polymorphic smart network, which is applied to a reinforcement learning agent, comprising the following steps: (S11), constructing a state of a global network characteristic, an action and a deep neural network model required for training the reinforcement learning agent, wherein the deep neural network model comprises a new execution network, an old execution network and an action evaluation network; (S12), setting a maximum number of steps in a round of training; (S13), acquiring the state of the global network characteristic in each step, inputting the state of the global network characteristic into the new execution network, controlling Software Defined Network (SDN) switches to execute actions output by the new execution network, acquiring the state of the global network characteristic and reward values after SDN switches execute the actions, and storing the actions, the reward values and states before and after the actions are executed in an experience pool; (S14), updating network parameters of the action evaluation network according to all reward values and the states before the actions are executed in the experience pool, comprising: inputting all states before the actions are executed in the experience pool into the action evaluation network to obtain expected values; calculating a discount reward in a state before each action according to the expected values and reward values corresponding to the expected values and a preset decay rate; and calculating a difference between the discount reward and the expected value; (S15), assigning network parameters of the new execution network to the old execution network, and updating the network parameters of the new execution network according to all actions and the states before the actions are executed in the experience pool; wherein said updating the network parameters of the new execution network according to all the actions and the states before the actions are executed in the experience pool comprises: inputting all states before the actions are executed in the experience pool into the old execution network and the new execution network, respectively, to obtain old execution action distribution and new execution action distribution; calculating a first probability and a second probability that each action in the experience pool appears in the old execution action distribution and the new execution action distribution corresponding to the each action, respectively; calculating a ratio of the second probability to the first probability; and multiplying all ratios by differences corresponding to the ratios and averaging to obtain a second loss value to update the network parameters of the new execution network; and (S16), repeating the steps (St3) to (St5) until a bandwidth occupied by each modal in the polymorphic smart network ensures communication transmission quality without overloading a network export.

2. The method according to claim 1, wherein the global network characteristic state comprises a number of packets in each modal, an average packet size of each modal, an average delay of each flow, a number of packets in each flow, a size of each flow and an average packet size in each flow.

3. The method according to claim 1, wherein the action is a sum of an average value and noises of action vectors selected under the state of the global network characteristic corresponding to the action.

4. The method according to claim 1, wherein said updating the network parameters of the action evaluation network according to all the reward values and the states before the actions are executed in the experience pool further comprises:

calculating a mean square deviation according to all differences, and taking the mean square deviation as a first loss value to update the network parameters of the action evaluation network.

5. A reinforcement learning agent training apparatus in a polymorphic smart network, which is applied to a reinforcement learning agent, comprising a construction module configured to construct a deep neural network model required for a state and an action of a global network characteristic and training the reinforcement learning agent, wherein the deep neural network model comprises a new execution network, an old execution network and an action evaluation network; a setting module configured to set a maximum number of steps in a round of training; (S13), an execution module configured to acquire the state of the global network characteristic in each step, input the global network characteristic state into the new execution network, control a SDN switch to execute actions output by the new execution network, acquiring states and reward values of the new execution network after the SDN switch executes the actions, and store the actions, the reward values and states in two periods before and after the actions are executed in an experience pool; (S14), a first updating module configured to update network parameters of the action evaluation network according to all the reward values and the states before the actions are executed in the experience pool; comprising: inputting all states before the actions are executed in the experience pool into the action evaluation network to obtain expected values; calculating a discount reward in a state before each action according to the expected values and reward values corresponding to the expected values and a preset decay rate; and calculating a difference between the discount reward and the expected value; (S15), a second updating module configured to assign network parameters of the new execution network to the old execution network, and update the network parameters of the new execution network according to all actions and the states before the actions are executed in the experience pool; wherein said updating the network parameters of the new execution network according to all the actions and the states before the actions are executed in the experience pool comprises: inputting all states before the actions are executed in the experience pool into the old execution network and the new execution network, respectively, to obtain old execution action distribution and new execution action distribution; calculating a first probability and a second probability that each action in the experience pool appears in the old execution action distribution and the new execution action distribution corresponding to the each action, respectively; calculating a ratio of the second probability to the first probability; and multiplying all ratios by differences corresponding to the ratios and averaging to obtain a second loss value to update the network parameters of the new execution network and (S16), a repeating module configured to repeat the steps (S13) to (SI5) until a bandwidth occupied by each modal in the polymorphic smart network ensures communication transmission quality without overloading a network export.

6. The method according to claim 1, further comprising: scheduling resources occupied by each modal according to a scheduling strategy output by the reinforcement learning agent.

7. The apparatus according to claim 5, further comprising: a scheduling module configured to schedule resources occupied by each modal according to a scheduling strategy output by the reinforcement learning agent.

8. An electronic device, comprising: one or more processors; a memory for storing one or more programs; wherein when the one or more programs are executed by the one or more processors, the one or more processors implement the reinforcement learning agent training method in a polymorphic smart network according to claim 1.

9. A non-transitory computer-readable storage medium on which computer instructions are stored, wherein the instructions, when executed by a processor, implement the steps of the reinforcement learning agent training method in a polymorphic smart network according to a non-transitory computer-readable storage medium on which computer instructions are stored, wherein the instructions, when executed by a processor, implement the steps of the reinforcement learning agent training method in a polymorphic smart network according to claim 1.

* * * * *